(12) United States Patent
Valand

(10) Patent No.: US 7,411,539 B2
(45) Date of Patent: Aug. 12, 2008

(54) METHOD FOR DETECTING THE PRESENCE OF RADAR SIGNAL EMITTERS, AN ELECTRONIC SUPPORT MEASURES UNIT AND A SYSTEM FOR DETERMINING THE POSITION AND IDENTITY OF SAID EMITTERS

(75) Inventor: Per Atle Valand, Oslo (NO)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 89 days.

(21) Appl. No.: 10/595,013

(22) PCT Filed: Nov. 3, 2003

(86) PCT No.: PCT/NO03/00368

§ 371 (c)(1),
(2), (4) Date: Dec. 16, 2005

(87) PCT Pub. No.: WO2004/113949

PCT Pub. Date: Dec. 29, 2004

(65) Prior Publication Data

US 2006/0132348 A1    Jun. 22, 2006

(30) Foreign Application Priority Data

Jun. 23, 2003   (NO) .................................. 20032897

(51) Int. Cl.
*G01S 7/36* (2006.01)
*G01S 13/00* (2006.01)

(52) U.S. Cl. .............................. 342/13; 342/19; 342/21; 342/90; 342/195

(58) Field of Classification Search .................... 342/13, 342/19, 21, 90, 195
See application file for complete search history.

(56) References Cited

U.S. PATENT DOCUMENTS

| | | | | |
|---|---|---|---|---|
| 4,700,191 A | * | 10/1987 | Manor | 342/13 |
| 4,764,979 A | * | 8/1988 | Noguchi et al. | 455/22 |
| 5,507,025 A | * | 4/1996 | Rodeffer | 455/266 |
| 6,081,229 A | * | 6/2000 | Soliman et al. | 342/357.05 |
| 6,163,297 A | * | 12/2000 | Rose | 342/418 |
| 6,480,139 B1 | * | 11/2002 | Hoctor | 342/13 |
| 6,501,258 B1 | * | 12/2002 | Levitt et al. | 324/76.37 |

(Continued)

OTHER PUBLICATIONS

European Patent Office, International Search Report for PCT/NO03/00368, dated Mar. 12, 2004.

*Primary Examiner*—Thomas H. Tarcza
*Assistant Examiner*—Harry K. Liu (57) ABSTRACT

A method for passively detecting the presence of radar signal emitters, in which an ESM unit receives radar signals with a number of antennas, each antenna covering a sector of the surrounding terrain. In order to conserve bandwidth, a technique is used, in which receiving channel is slit into a number of sub-bands. Each sub-band is converted to an IF channel. The individual IF channels are combined into a common IF channel in an adder. This process is repeated once more in order to bring the signals down to baseband, where they are digitized and processed to find the direction to and the identity of the emitter source. A number of ESM units are connected to a control center. In the control center the position of the radar emitter is determined by triangulation. In addition, the identity of the emitter is determined by comparison with known emitter signatures stored in a database.

5 Claims, 11 Drawing Sheets

U.S. PATENT DOCUMENTS

| | | | |
|---|---|---|---|
| 6,545,632 B1 * | 4/2003 | Lyons et al. | 342/45 |
| 6,898,235 B1 * | 5/2005 | Carlin et al. | 375/219 |
| 2004/0072575 A1 * | 4/2004 | Young et al. | 455/456.1 |
| 2004/0121753 A1 * | 6/2004 | Sugar et al. | 455/333 |
| 2004/0135717 A1 * | 7/2004 | Gounalis | 342/13 |
| 2004/0190660 A1 * | 9/2004 | Morris et al. | 375/350 |
| 2006/0132348 A1 * | 6/2006 | Valand | 342/13 |
| 2007/0116154 A1 * | 5/2007 | Morris et al. | 375/332 |

* cited by examiner

METHOD FOR DETECTING THE PRESENCE OF RADAR SIGNAL EMITTERS, AN ELECTRONIC SUPPORT MEASURES UNIT AND A SYSTEM FOR DETERMINING THE POSITION AND IDENTITY OF SAID EMITTERS

FIELD OF THE INVENTION

Radar ESM systems are used to detect and identify radars present in an area, by determining the direction of arrival, and emitter characterization of radar pulses.

TECHNICAL BACKGROUND

Such systems include a receiver covering the pertinent radar frequencies. The receiver needs to cover a wide radar frequency band (typical 2-18 GHz) with 360° of angular coverage. At the same time, the system must perform thorough analysis of each received pulse in order to identify radar emitters. The system should be man-portable in field, and should be able to operate with battery power. Multiple systems should be able to find emitter position (both bearing and range).

Three main solutions are known:

Wide Bandwidth Crystal Receiver

A crystal receiver may be used to cover the entire bandwidth. This receiver detects the signal envelope, and coarse pulse parameters may be measured. At least four such receivers are needed to achieve an angular coverage of 360°.

The wide bandwidth crystal receiver is capable to perform coarse pulse analysis only. Important pulse parameters such as carrier frequency and frequency or phase modulation are lost. Thus emitter characterization is coarse at best. In a scenario with multiple emitters, the use of two or more ESM-receivers at different locations to position the target emitter may fail since emitters received in one receiver may be associated with a different emitter received in other receivers.

Parallel Receivers

Multiple receivers are used to cover the entire bandwidth. With current technology, approximately 20 parallel receivers may be used to divide the entire bandwidth into sub-GHz channels, which in turn may be processed with current digital processors. In order to cover 360°, at least 4 such receiver packs with the antennas pointing in different directions are needed to perform direction finding.

The parallel receiver solution performs high quality pulse measurement, and may therefore be used for emitter characterization. Determining emitter position may be performed when two or more receivers at different locations are used, since each pulse and each emitter may be identified. On the other hand, this solution requires massive parallelism in both radio hardware and processing hardware. The result is high weight and very high power consumption rendering this concept useless for man-portable operation.

Scanning Receivers

In order to perform detailed pulse analysis, a single narrowband receiver may be used for each antenna direction. The receiver is used to scan the entire frequency bandwidth sequentially. Detailed pulse analysis may be performed within the narrow instantaneous bandwidth.

The scanning receiver may be built as a compact unit with low power consumption, and may also provide detailed pulse measurement. The problem with this receiver configuration is the low probability of intercept due to low instantaneous bandwidth. Radars operating with single scan policy will most probably not be detected.

SUMMARY OF THE INVENTION

It is an object of the present invention to provide an ESM system for detecting the presence of radars in an area that covers an adequate instantaneous bandwidth and is able to perform a detailed pulse analysis in order to identify the emitter source.

Another object is to provide a system with the above features while being light in weight and power efficient.

These objects are met by a method, an Electronic Support Measures unit and a system according to the present invention as covered by the appended patent claims.

BRIEF DESCRIPTION OF THE DRAWINGS

The invention will now be described in detail in reference to the appended drawings, in which.

DETAILED DESCRIPTION OF THE INVENTION

Figure 1:
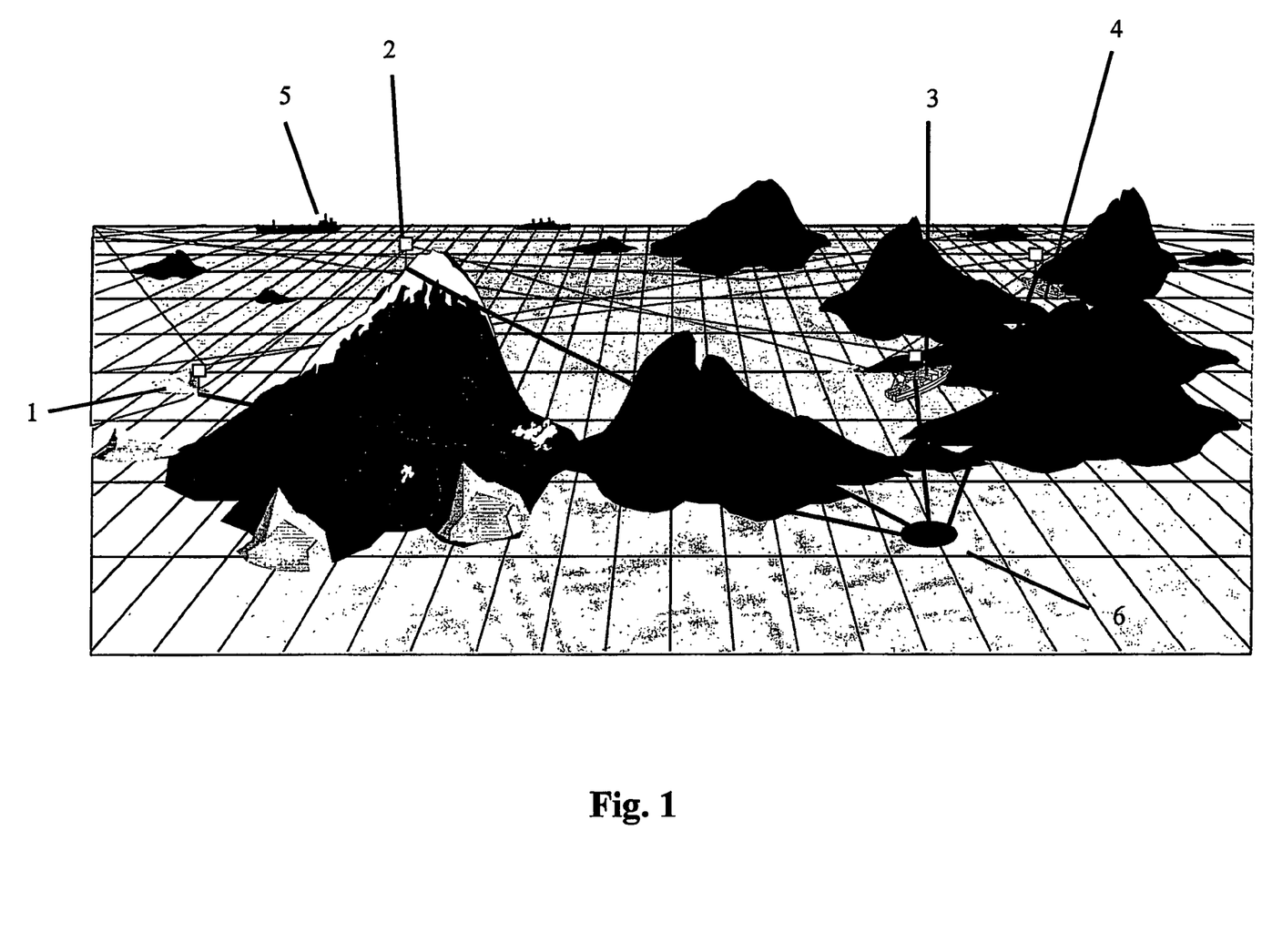
FIG. 1 shows a number of ESM-units according to the present invention in use; multiple ESM-sensors are networked for determining the posistion of a radar emitter, using a common emitter database for recognition.

FIG. 1 shows a typical setup for an ESM receiver system. A number of ESM-units 1-4 are placed in the terrain along a coastline. Each ESM-unit is adapted to receive and analyse signals emitted by radars present in the surrounding area. In this case a tanker 5 is sailing along the coast, while its radar is constantly scanning the horizon. Each ESM-unit 1-4 receives the radar signals, resolves the direction of arrival and identifies the signature. The ESM-units are connected in a network. Said network includes a control center 6. In the control center, the data received from the ESM-units 1-4 are compared and analysed in order to find the position of the radar source (tanker 5) and its identity (based on the signature of the radar pulses and a database of known signatures).

Each ESM-unit 1-4 includes a number of antennas pointing in different directions, receivers and signal processing circuitry. Each antenna is covering a sector of the surrounding area, and the total assembly is covering the whole horizon.

The Receiver Unit

Figure 2:
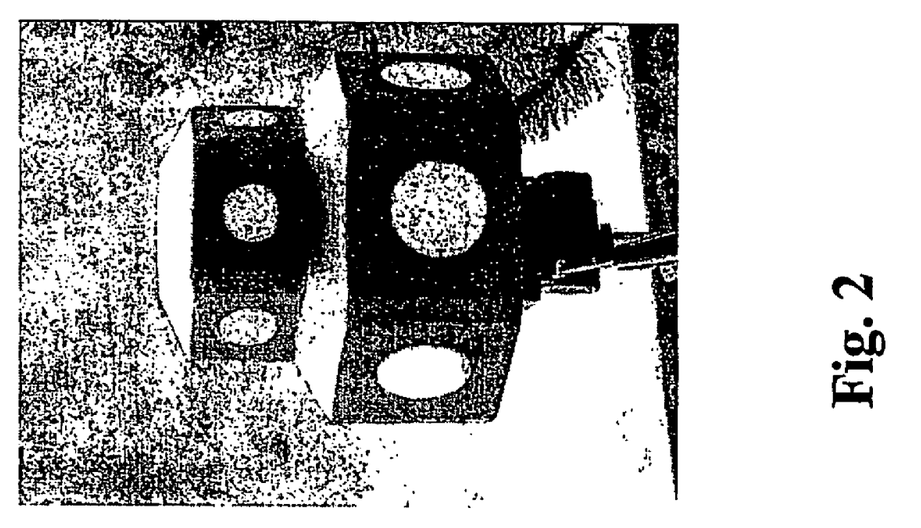
FIG. 2 shows the physical design of a prototype receiver.

The physical design of a prototype ESM-unit according to the present invention is shown in FIG. 2. 12 antenna elements are used to cover 2 to 18 GHz in 6 directions. In each direction two antennas are used; the lower large antenna covering the frequency band of 2-6 GHz, while the small upper antenna covers 6-18 GHz.

Figure 3:
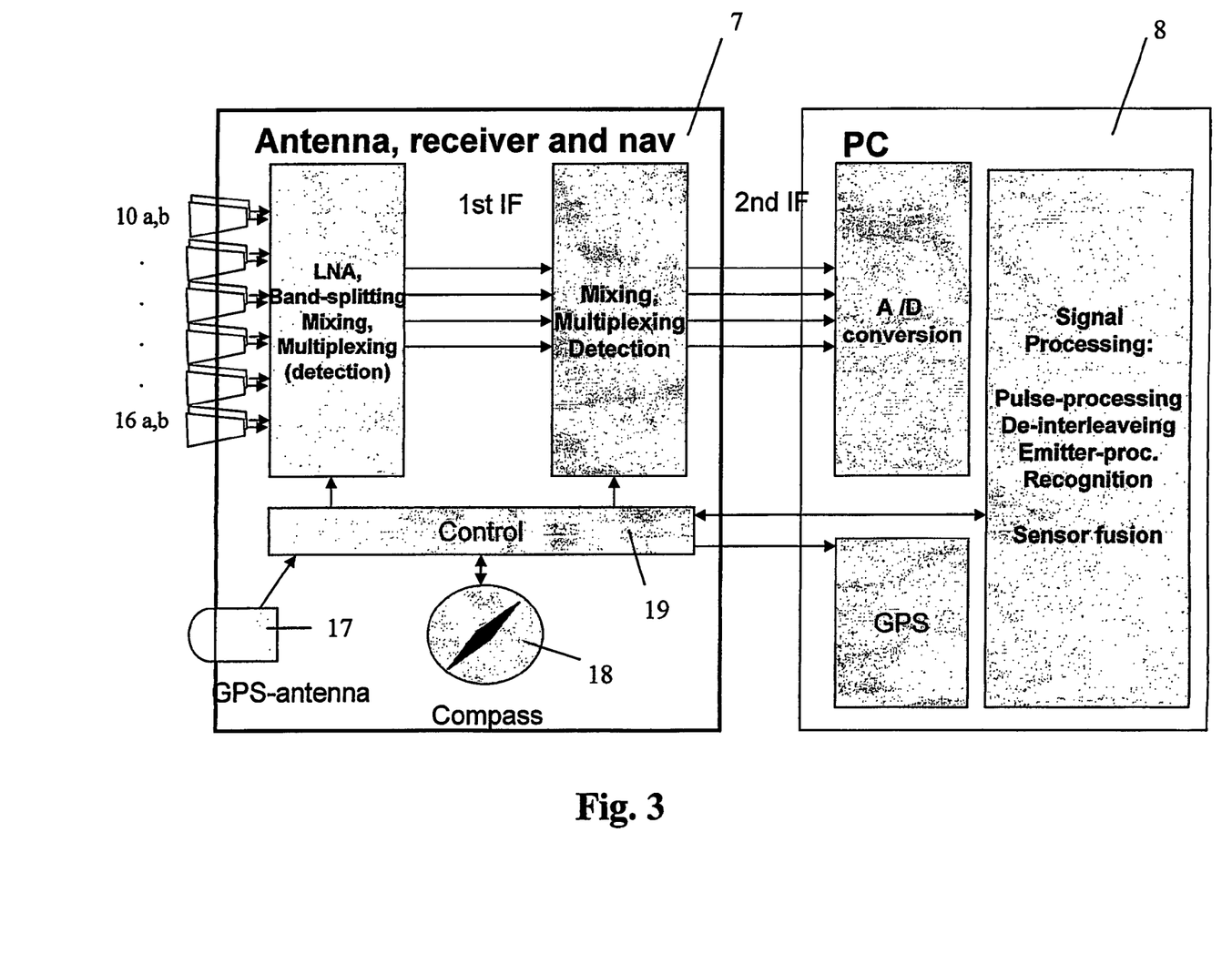
FIG. 3 is an overview of a system according to the present invention.

The ESM-unit or receiver system consists of two units, namely: The Receiver unit 7 (Antenna, Receiver and Navigation sub-unit) and the Processing Unit 8 as shown in FIG. 3.

The antennas 10$a$, $b$-16$a$, $b$ are delivering their signals to the receiver unit 7. In the receiver unit 7 the signals from each of the upper antennas 10$a$-16$a$ are split into three 4 GHz wide sub-bands, i.e. a 6-10 GHz sub-band, a 10-14 GHz sub-band, and a 14-18 GHz sub-band. The three sub-bands together with the 2-6 GHz sub-band from the lower antenna are converted into a single intermediate frequency (IF). There is one IF channel for each antenna set, i.e. a total of six IF channels. IF channels of opposing antennas are combined into one channel (not shown in the figures); thus providing a total of three IF channels.

In the receiver's second stage, FIG. 6, the 4 GHz IF is again split into four 1 GHz wide sub-bands, which are further down-converted and combined into baseband channels of 1 GHz bandwidth. Thereafter the signals are sent to the processing unit 8 for digitalization and processing. The conversion scheme is detailed in FIG. 4.

In addition to the antenna/receiver chain, this unit contain an attitude determination unit (compass) 18 and a GPS antenna 17. All is contained within a single unit that may be mounted either on a tripod or fixed on an antenna mast.

Radio Design

Figure 5:
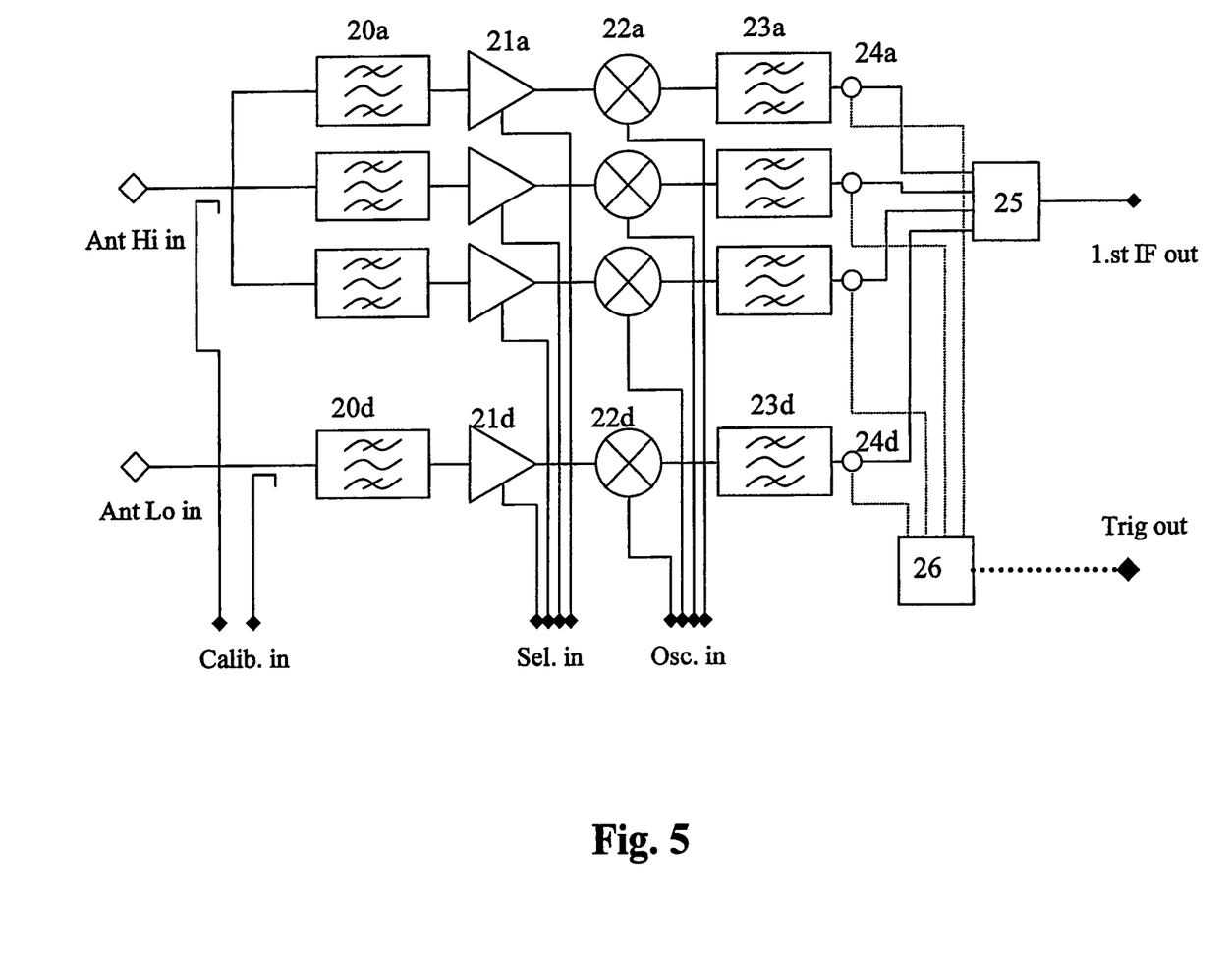
FIG. 5 is a block diagram of the receiver front end.

The receiver front-end is shown in FIG. 5. The Ant Lo input receives the signal from one of the lower antennas 10$b$-16$b$, while Ant Hi in receives the signal from the upper antenna 10$a$-16$a$. The signals are filtered in band-pass filters 20$a$-20$d$, whereupon the signal from the upper antenna is split into three sub-bands. The signals from the band-pass filters are amplified in low-noise preamplifiers 21$a$-21$d$ and fed to mixers 22$a$-22$d$. In the mixers 22$a$-22$d$, the signals are downconverted to IF channels of identical frequency range and filtered in another set of band-pass filters 23$a$-23$d$. The outputs from the IF-filters 23$a$-23$d$ are combined in an adder 25.

Signal from each sub-band are thus overlaid each other. Since the signals are pulsed, the probability of simultaneous signal from different channels is quite low.

In order to determine direction and frequency of incoming pulses, broadband pulse detection is performed in each of the original channels before combining. For this end, four detectors 24$a$-24$d$ are included, one in each IF channel. The outputs from the detectors are fed to a comparator 26, for identifying which channel a given signal occurs in.

Figure 6:
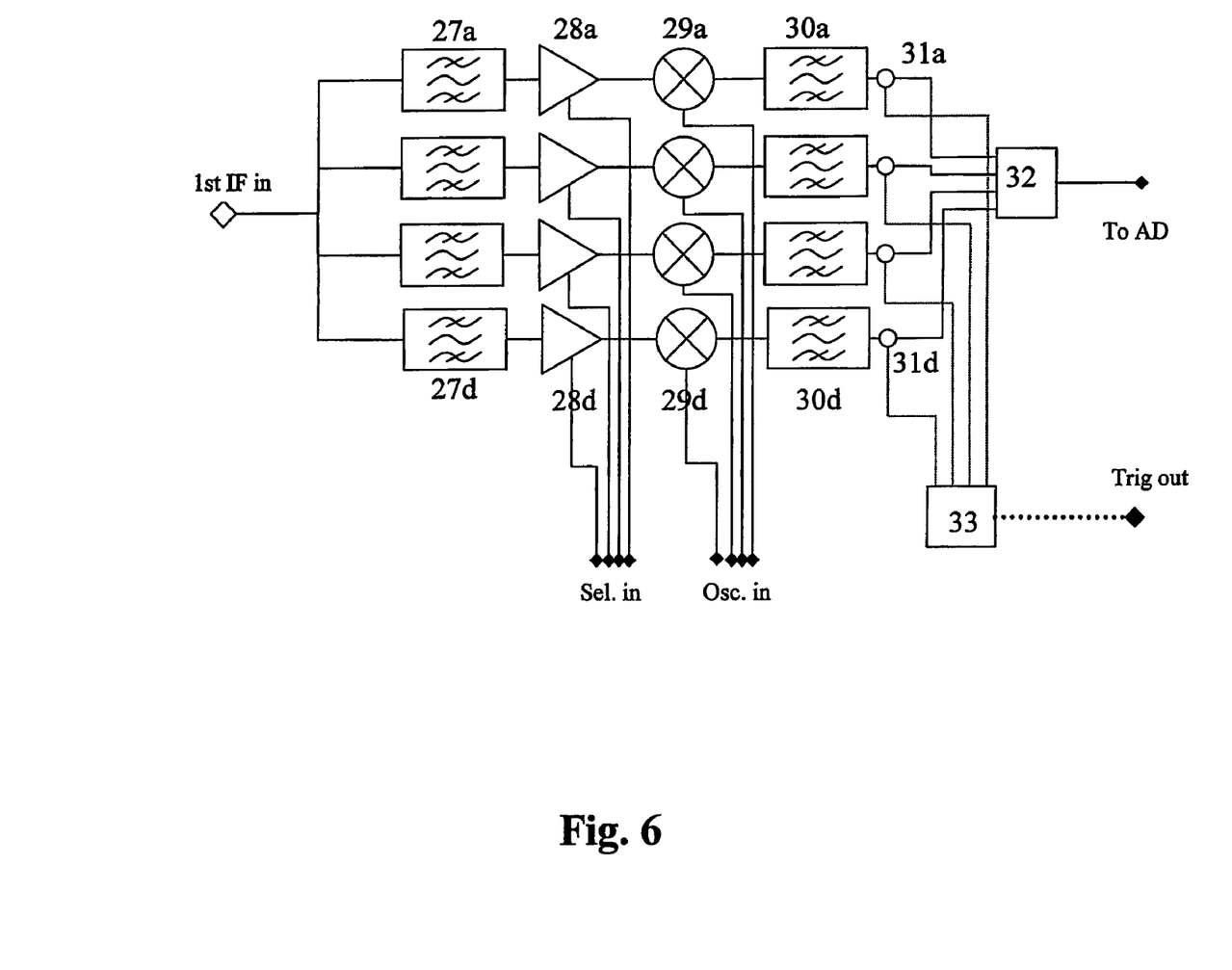
FIG. 6 is a block diagram of the receiver's second stage.

The second stage of the receiver is shown in FIG. 6. Again, the first IF signal received from the front-end in FIG. 5 is split into four sub-bands in band-pass filters 27$a$-27$d$, amplified in amplifiers 28$a$-28$d$, down-converted in mixers 29$a$-29$d$, filtered in band-pass filters 30$a$-30$d$ and combined in adder 32. The resulting baseband channel in the range 0-1 GHz has a bandwidth matched to the A/D converters in the subsequent processing system (typical 1 GHz with 2.5 GS/s A/D converters).

In addition a oscillator and control block (not shown) is needed to generate all oscillator frequencies, control signals to the amplifiers and handle trigger signals from each of the channels.

The resulting channels are narrow enough for A/D conversion, and the pulses may be processed with one single processor. The necessary number of parallel A/D converters is equal to half the number of antenna directions (typical three with six antenna directions).

The Processing Unit

Figure 4:
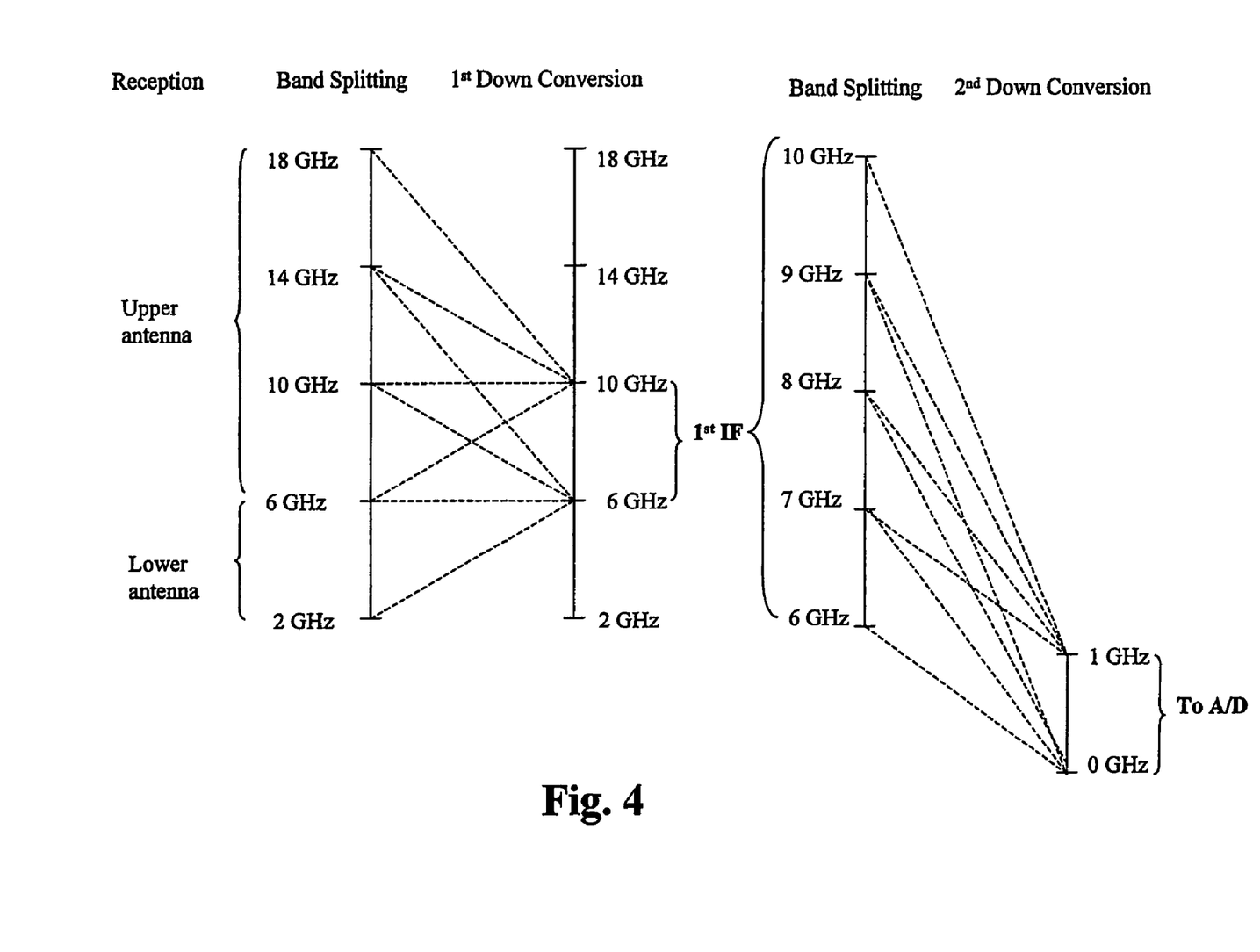
FIG. 4 shows the frequency band splitting and down conversion scheme used in the inventive system.

A four-channel 1 GS/s A/D converter is used for digitalisation of the receiver channels. A GPS receiver is used for position determination, and the compass in the Antenna unit is read for antenna attitude determination. The processing unit digitises pulses received, performs pulse-processing, de-interleaving and multi-path analysis before emitter processing is performed. The following process is performed on the detected pulses:

For each pulse:
Convert pulse series to complex form
Measure Pulse peak amplitude and average amplitude
Measure Direction of Arrival (DOA) based on amplitude difference and phase difference in the three channels
Measure Pulse Width (the duration of the pulse)
Measure Carrier frequency (corrected according to sub-band detectors)
Measure Time of Arrival (TOA)
Insert pulses into frequency/DOA histogram
After detection of a predetermined number of pulses or upon reaching a predetermined time limit perform:
De-interleaving (identifying which pulses come from the same emitter):
Based on frequency/ DOA histogram
Perform emitter analysis:
Improve DOA measurement by averaging
Perform echo-recognition by identifying "same" emitter in different directions
Perform emitter antenna analysis (rotation speed and beam width) based on pulse amplitudes
Perform emitter classification based on all emitter parameters (excluding DOA)
Perform emitter recognition based on all emitter parameters (excluding DOA) and sampled pulse waveform compared to emitter library.
If multiple ESM-sensors observes the same area, DOA information from neighbouring ESM-sensors to triangulate in order to find emitter position At this stage, data may be displayed locally or set to the network for sensor fusion with other sensors. If multiple ESM sensors are connected in a network, local sensor fusion may be performed to provide target positioning. In addition emitter recognition analysis is performed using either a local or network based emitter database. FIG. 4 shows the use of multiple ESM-receivers for emitter position determination. A common emitter database (shown as a green oval on shore) is used to convey emitter information from one ESM-receiver to another.

Emitter database maintenance is envisioned integrated with the ESM system. Whenever a new emitter is encountered, the emitter must be identified by other means, but the data is stored for recognition purposes.

The Processing Unit controls the Antenna, Receiver and Navigation unit with respect to frequency coverage. During battery operation, a several non-continuous operation modes may be specified in order to expand battery life.

The processing unit is contained in a single unit with integrated batteries in man-portable mode or rack mounted in platform installation.

Pulse Processing Algorithm

The processing system receives pulse signal from the radio head. The pulses are digitized in the sampler system such that each pulse is stored as 3 series of samples for each pulse, one series for each channel. In order to determine the pulse parameters, each pulse data series is analyzed with the following algorithm:

Perform real to complex FFT (Fast Fourier Transform) for all 3 series

Figure 7:
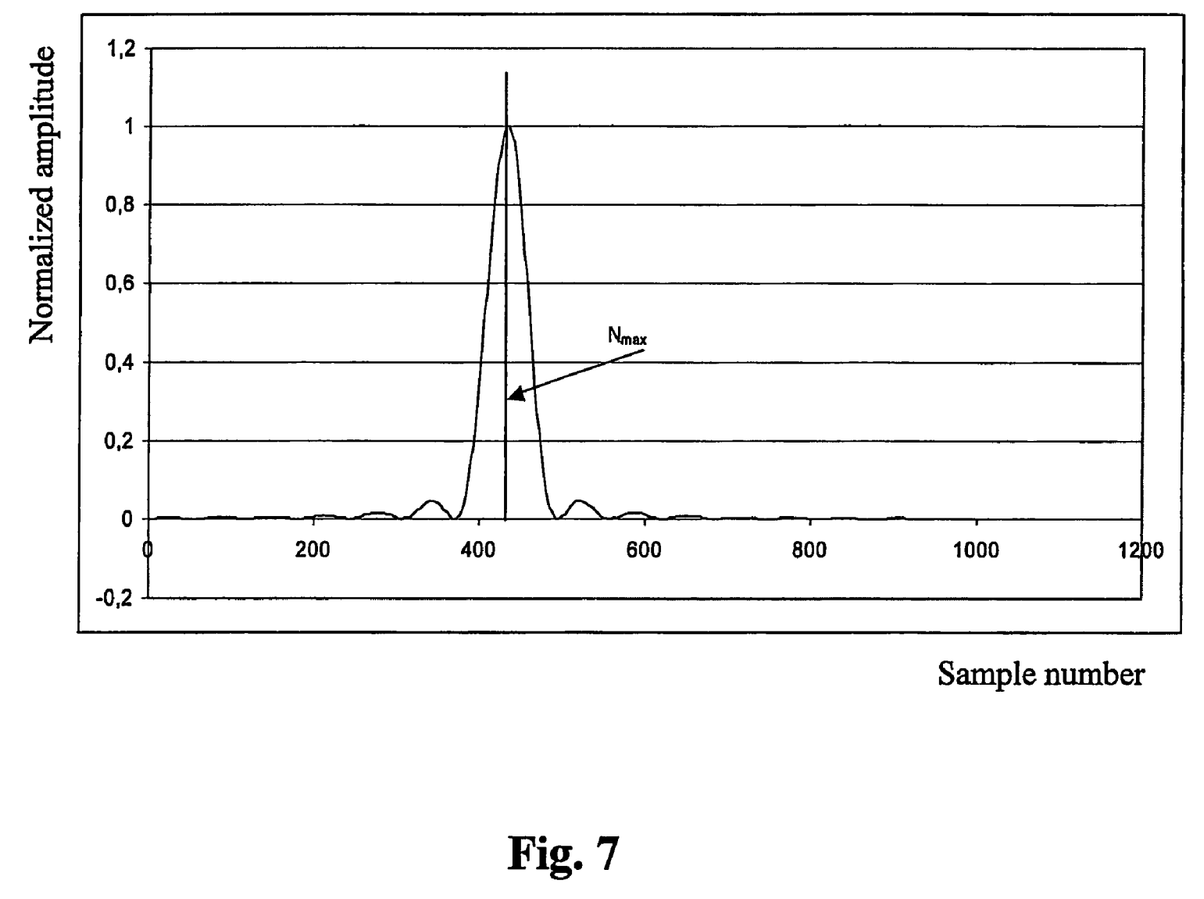
FIG. 7 is a diagram showing the Fourier transform of a received pulse; used for calculating the carrier frequency of a radar emitter.

Determine carrier frequency:
Locate peak power in the series ($n_{max}$), see FIG. 7.
Calculate carrier frequency:

$$f_c \approx \frac{n_{max}}{N} f_s + f_{chan}$$

where N is number of samples in series $f_s$ is sampling frequency and $f_{chan}$ is the frequency offset of the radio channel (received from the radio head)

Perform complex inverse FFT (The samples are now complex, and the series length is halved)

Figure 8:
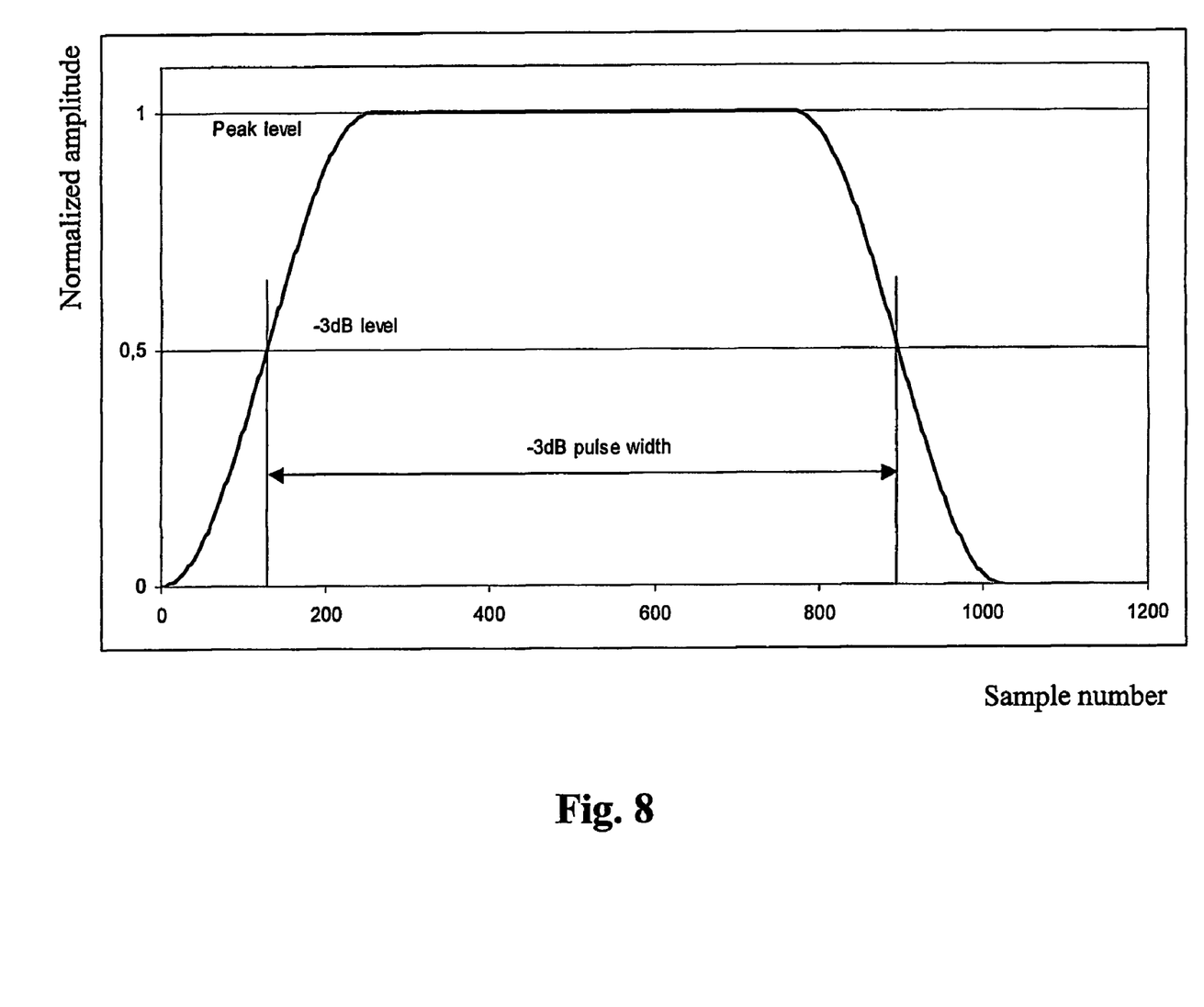
FIG. 8 is a diagram showing a pulse from a radar emitter; used for calculating the pulse width.

Scan series and determine peak power ($P_{max}$) for each channel and compute −3 dB level: $P_{3\ dB} = P_{max}/2$ Scan series and locate −3 dB crossings, calculate 3 dB pulse width (see FIG. 8)

Calculate time of arrival as data series start time+offset to first 3 dB crossing Estimate direction of arrival from pulse series from peak amplitudes:

Center channel ($Ch_0$) has maximum power (from radio head)

Figure 9:
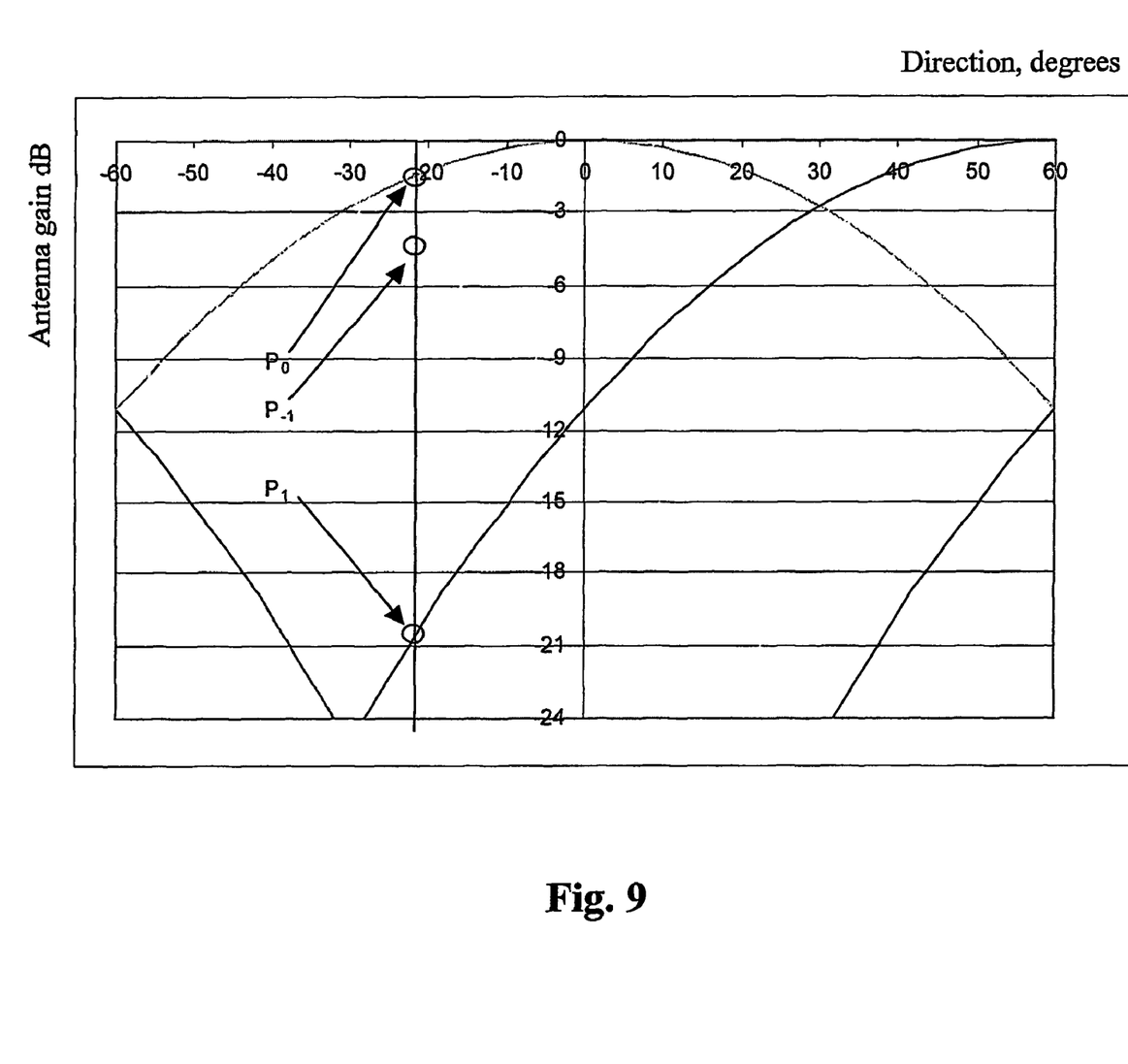
FIG. 9 is a diagram showing the gain of three different antennas; used for calculating Direction of Arrival based on pre-calculated antenna lobe calibration function.

Calculate DOA from predetermined antenna lobe calibration function: $DOA=g(P_{-1}, P_0, P_1)$ see FIG. 9.

Insert pulse with parameters into 2-dimensional histogram, indexed by carrier frequency and direction of arrival.

In summary, the process of finding the direction to a radar emitter includes three steps:

1. The detectors in the IF channels are used to decide if a given signal is received by a front or rear antenna.
2. A comparison between the signal amplitudes in the IF channels, together with the antenna characteristics (FIG. 9) is used to get a coarse estimate of the direction to the emitter.
3. A phase-comparison between the channels is used to get the direction with full accuracy. Step 2 above is needed as a preparatory step, as the phase-comparison is ambigous.

Emitter Processing Algorithm

After detection and processing of a predetermined number of pulses (or upon reaching a predetermined time limit), a number of pulses from the observed emitters have been analysed and entered into the histogram. An example with two emitters i shown in FIG. 10.

Figure 10:
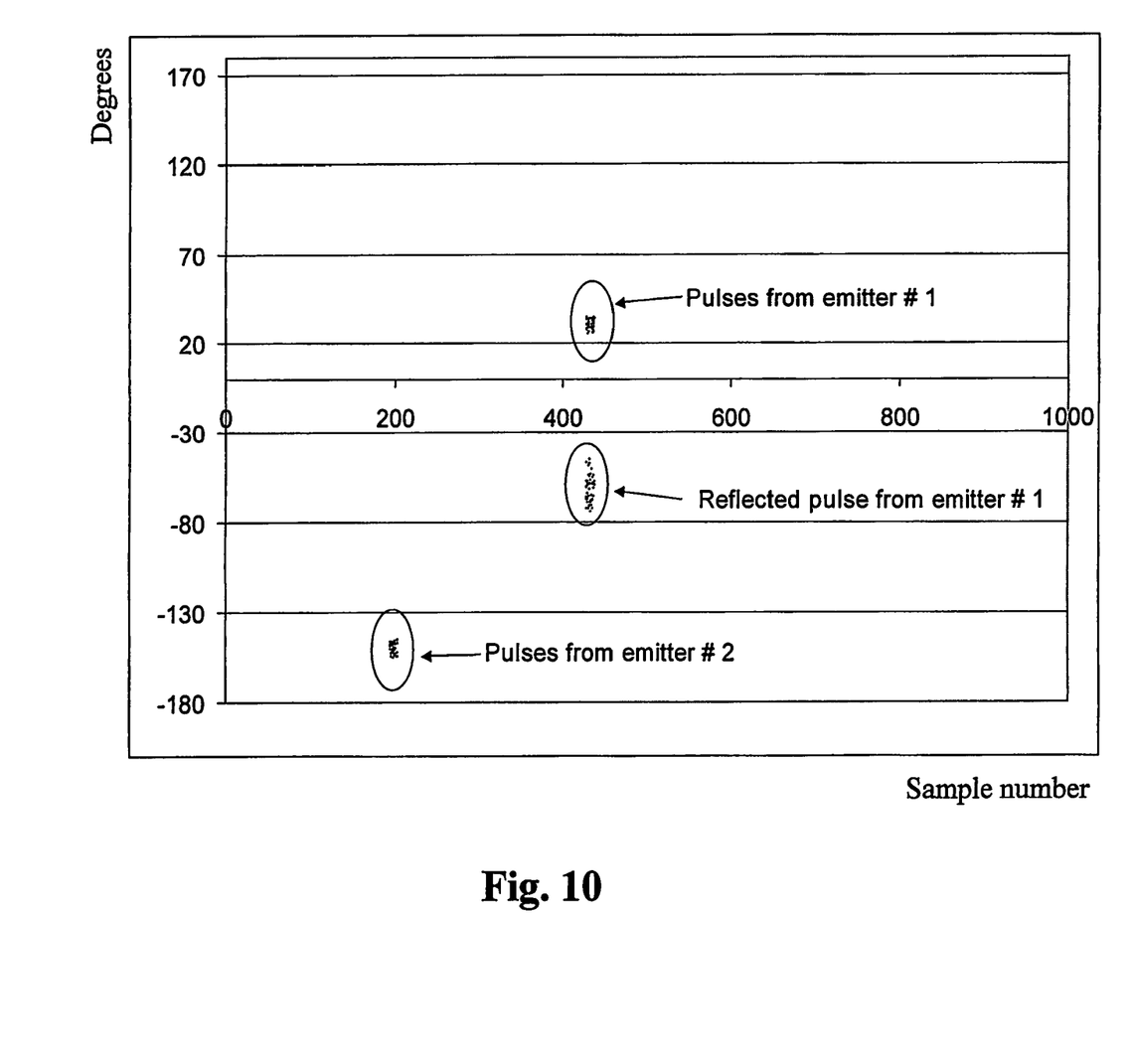
FIG. 10 shows received pulses plotted in a DOA/frequency-diagram.
Figure 11:
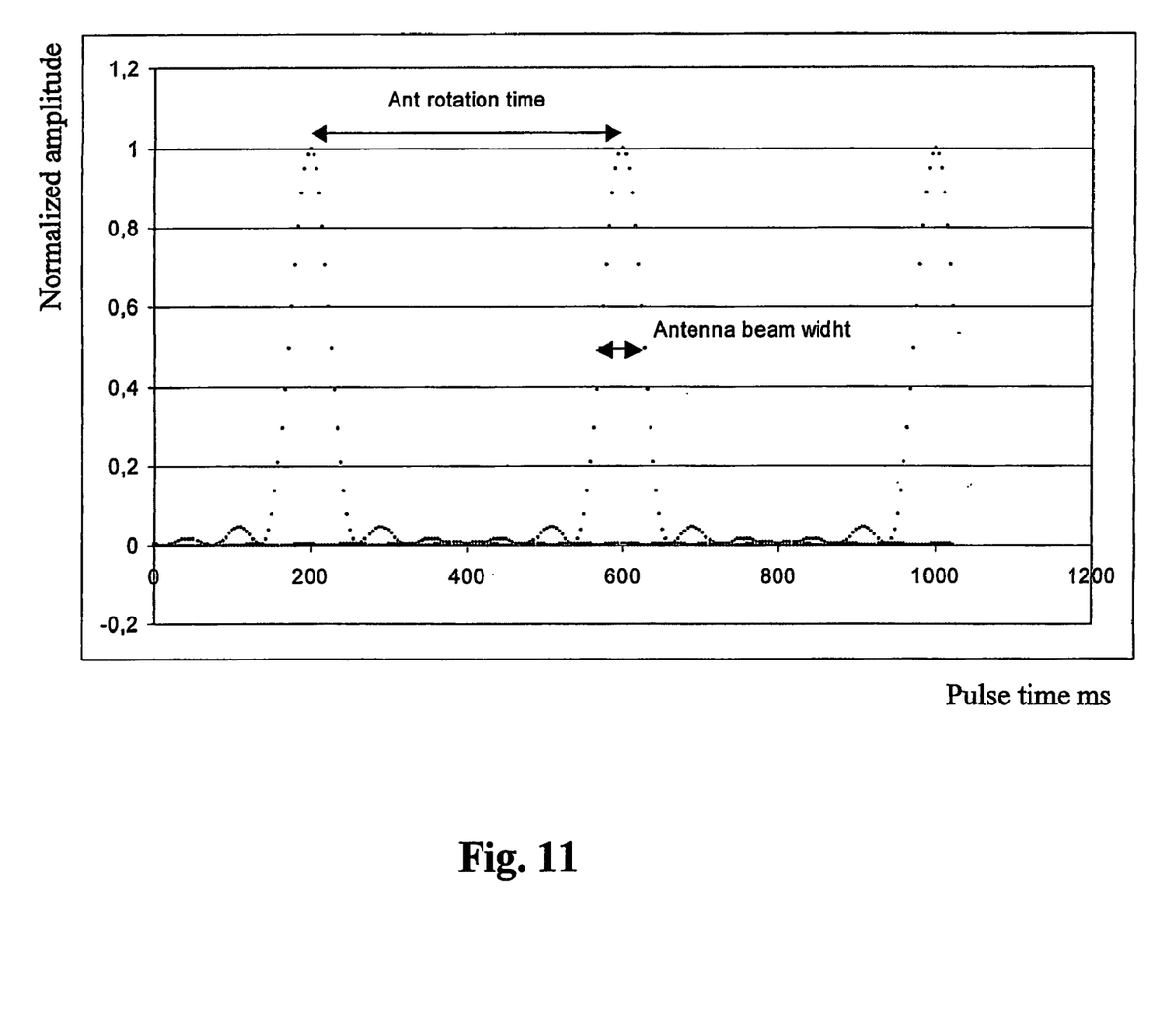
FIG. 11 shows the pulses received from a radar emitter; used for measuring emitter antenna beam-width and rotation time.

In order to de-interleave pulses (sort pulses by emitter), pulses are extracted from the DOA/frequency histogram, starting with the histogram cell with largest pulse count. In the above example, 3 "emitters" would be extracted, namely pulses from emitter #1, pulses from emitter #3 and finally pulses from emitter #1 reflected off a reflector (hillside, building etc). Each "emitter" is analyzed according to:

Calculate average and standard deviation of all pulse parameters except pulse amplitude Perform Emitter antenna analysis (see FIG. 11):
Measure time between antenna main lobe passings (time from local maximum to local maximum)
Measure antenna beam width (same principle as measuring pulse width)

Perform emitter PRI analysis
Measure time from pulse to pulse and calculate average
Optionally: perform analysis of PRI variation (pattern recognition)

After emitter parameter estimation, the directions to and other parameters to all emitters are known. The list also includes "emitters" that are actually copies of other emitters due to reflections off diferent surfaces. These artifacts have the same parameters as the originating emitter except Direction of arrival. In order to determine which emitter is the original the following analysis is performed:

Compare peak amplitude. The artifact will most often have lower amplitude than the correct emitter Compare standard deviations of pulse parameters. The artifact will have larger standard deviations The emitters are now analyzed and the direction of arrival, pulse parameters and emitter characteristics have been determined.

Emitter Position Determination Using Multiple POS Sensors

Each sensor analyze pulses from the observed emitters. When emitter analysis is complete, the emitter parameters are sent to any neighbouring POS sensors by data-network.

Upon reception of emitter parameters from a neighbouring POS sensor, this emitter is compared to all of the locally detected emitters (using all parameters except DOA). When a match is found, the position is determined by triangulation (position of each POS sensor is known, DOA to the emitter from each POS sensor has been determined, thus the emitter position may be determined by simple geometry)

Emitter Recognition/Emitter Database

In order to recognize emitters from previous observations, the emitter parameters are stored in a emitter database. Upon reception of a new emitter, the emitter parameters are compared with the parameters stored in the database. If a match is found, the emitter is assumed to be the same as the one found in the database. If not, the new emitter is stored in the database.

The database may either be stored locally or accessed by data network. Using a networked database provides the ability to share information about new emitters between multiple POS sensor as soon as the new emitter is detected.

Direct Conversion Embodiment

While the inventive receiver has been described employing a two-stage conversion scheme with an intermediate frequency, and which is the preferred embodiment of the invention at the present state of the art, the concept of the invention has a wider application.

Under certain circumstances, a direct conversion receiver can be preferred. In this version (not shown), the signals from the antenna(s) are split into a number of sub-bands and mixed directly down to baseband, before they are combined in an adder unit. The output from the adder is digitized and processed as in the example described earlier.

Technical Abbreviations
A/D—Analog/Digital
DOA—Direction of Arrival
ESM—Electronic Support Measures
GPS—Global Positioning System
GS/s—GigaSamples per second
IF—Intermediate Frequency
PRI—Pulse Repetition Interval
TOA—Time of Arrival

The invention claimed is:

1. An Electronic Support Measures system for detecting and identifying radar signals present in an area, comprising:
   a plurality of antenna sets for receiving the radar signals, each antenna set including at least one antenna and each set covering a sector of the surrounding area;
   a plurality of receiver front ends, each receiver front end being connected to an antenna set covering a specific sector;
   a plurality of first band-pass filters connected to a first antenna set, said band-pass filters splitting the signals received from the first antenna set into a number of first sub-bands;
   a plurality of first low noise preamplifiers, each connected with its input to a first band-pass filter and the output connected to one of a corresponding number of first mixers, said mixers being adapted to convert a first sub-band into an Intermediate Frequency ($1^{st}$ IF), the output from each first mixer being fed to a second band-pass filter tuned to the frequency of said Intermediate Frequency, an output of said second band-pass filters being connected to a first adder, said adder being adapted to combine the signals from the second band-pass filters into a common Intermediate Frequency channel;
   a plurality of receiver second stages, each connected to a receiver front end and receiving said common intermediate frequency channel, said intermediate frequency channel being fed to a number of third band-pass filters in order to split said common intermediate frequency channel into a number of second sub-bands, the output of each third band-pass filter being fed to a second amplifier, the output of the second amplifier being fed to a second mixer, said second mixer being adapted to convert said intermediate frequency channel into baseband, the output of the second mixer being fed to a fourth band-pass filter, the outputs of all fourth band-pass filters being fed to a second adder, said second adder being adapted to combine the signals received from the fourth band-pass filters into a common baseband channel; and,
   an Analog-to-Digital converter connected to said second adder and being adapted to digitize the signals received from said second adder, a signal processing unit receiving the signal from the Analog-to-Digital converter.

2. The system recited in claim 1, further comprising a plurality of first detectors, each with an input connected to the output of said second band-pass filters, an output of each first detector being connected to an input of a comparator, a control logic connected to said first comparator, said logic being adapted to identify on which antenna a given signal is received.

3. The system recited in claim 2, wherein each first low noise preamplifier and each second amplifier are equipped with an enable/disable input, said enable/disable input being connected to said control logic, said control logic being adapted to enable the operation of selected amplifiers and disable other amplifiers, in order to save power.

4. The system recited in claim 1, wherein said system includes a total of 12 antennas, of which two antennas point in each direction, one of said two antennas covering the range of 2-6 GHz and the other covering the range of 6-18 GHz.

5. The system recited in claim 1, further comprising:
   a network connecting a plurality of such Electronic Support Measures systems to a control centre, said control centre including a database of known radar emitter signal signatures, wherein said control centre is operative to 1) receive direction and signature information of received radar signals from said plurality of Electronic Support Measures systems, 2) determine the position of a radar emitter by triangulation, and 3) determine the identity of said radar emitter by comparison with emitter signatures stored in said database.

* * * * *

UNITED STATES PATENT AND TRADEMARK OFFICE
CERTIFICATE OF CORRECTION

PATENT NO. : 7,411,539 B2
APPLICATION NO. : 10/595013
DATED : August 12, 2008
INVENTOR(S) : Valand It is certified that error appears in the above-identified patent and that said Letters Patent is hereby corrected as shown below:

In Column 2, Line 4, insert -- BRIEF --, before "SUMMARY".

Signed and Sealed this

Tenth Day of March, 2009

JOHN DOLL
*Acting Director of the United States Patent and Trademark Office*